DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 276

T904,029
COPOLYMERS

Stuart Gaskin, Hatfield, and Eric Nield, Watton-on-Stone, England, assignors to Imperial Chemical Industries Limited, London, England

Filed Feb. 22, 1972, Ser. No. 228,261
Claims priority, application Great Britain, Mar. 4, 1971, 6,027/71
Int. Cl. C08g *41/04*
U.S. Cl. 260—857 TW
No Drawing. 38 Pages Specification

Block copolymers having from 1 to 99% of units of a high modulus aromatic polymer such as aromatic polyamides and aromatic polyesters and 99 to 1% of units derived from a thermoplastic condensation polymer compatible with the block copolymer and having a group capable of condensation with a monomer of the high modulus polymer are disclosed. Suitable high modulus polymers may be obtained by polymerizing an amino or hydroxy-carboxylic acid or polymerizing substantially equimolar proportions of an aromatic diamine or diol with an aromatic dicarboxylic acid. Preferably the high modulus polymer contains units derived from 1,4-diaminobenzene or terephthalic acid. Thermoplastic condensation polymers of the type described include polysulphones, polyketones, aliphatic polyamides for example nylons, polyesters for example polyethylene terephthalate, polyolefins and aromatic polycarbonates, provided that the polymer is thermoplastic. Copolymers of the present invention exhibit increased modulus and impact strength by providing a block copolymer having units of a reinforcing material, an aromatic polyamide or aromatic polyester, and units of the thermoplastic condensation polymer to be reinforced. The copolymers are useful for forming filaments and shaped articles.

Also disclosed are methods to produce the block copolymers as characterized above and include reaction of the aromatic polyamide or polyester with the thermoplastic condensation polymer in the presence of a solvent and an acid acceptor. Another method disclosed reacts a polyamide, polysulphone or lactam with an aromatic sulphone in the presence of an alkaline catalyst. Illustrative of the method is the reaction of caprolactam with an aromatic polysulphone in the presence of sodium hydride to produce a chain of caprolactam units and pendant branches grafted thereto comprising units of the formula

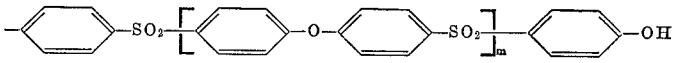

*m* being approximately 1 to 5.